United States Patent
Edgar et al.

(10) Patent No.: US 6,814,303 B2
(45) Date of Patent: Nov. 9, 2004

(54) FLUID-COOLED MOUNT FOR AN INJECTOR

(75) Inventors: Bradley L. Edgar, Oakland, CA (US); Richard G. Lemke, San Diego, CA (US); Marc D. Rumminger, Berkeley, CA (US); Michael Streichsbier, El Cerrito, CA (US); Dean B. Wehrley, Carlsbad, CA (US)

(73) Assignee: Cleaire Advanced Emission Controls, San Leandro, CA (US)

( * ) Notice: Subject to any disclaimer, the term of this patent is extended or adjusted under 35 U.S.C. 154(b) by 69 days.

(21) Appl. No.: 10/407,140

(22) Filed: Apr. 3, 2003

(65) Prior Publication Data

US 2003/0230646 A1 Dec. 18, 2003

Related U.S. Application Data

(60) Provisional application No. 60/369,955, filed on Apr. 3, 2002.

(51) Int. Cl.[7] .............................................. F23D 14/66
(52) U.S. Cl. ......................................... 239/128; 60/286
(58) Field of Search ................................ 239/128, 137, 239/533.1; 60/276, 286, 294, 301

(56) References Cited

U.S. PATENT DOCUMENTS

| | | | |
|---|---|---|---|
| 3,842,600 A | 10/1974 | Nakajima et al. | 60/276 |
| 3,945,204 A | 3/1976 | Knapp | 60/274 |
| 4,341,193 A | 7/1982 | Bowler | 123/472 |
| 4,436,071 A | 3/1984 | Hafner et al. | 123/472 |
| 4,503,826 A | 3/1985 | Kessler et al. | 123/470 |
| 4,539,962 A | 9/1985 | Nichols | 123/470 |
| 4,905,651 A | 3/1990 | Bonfiglioli et al. | 123/445 |
| 5,280,774 A | 1/1994 | Entenmann et al. | 123/457 |
| 5,522,218 A | 6/1996 | Lane et al. | 395/325 |
| 5,605,042 A | 2/1997 | Stutzenberger | 60/286 |
| 5,915,626 A | 6/1999 | Awarzamani et al. | 239/135 |
| 5,968,464 A | 10/1999 | Peter-Hoblyn et al. | 423/235 |
| 6,279,603 B1 | 8/2001 | Czarnik et al. | 137/339 |
| 6,481,641 B1 | 11/2002 | Mieney et al. | 239/139 |

Primary Examiner—Michael Mar
Assistant Examiner—Thach H. Bui
(74) Attorney, Agent, or Firm—Heller, Ehrman, White & McAuliffe, LLP

(57) ABSTRACT

A fluid-cooled mount for an injector; suitable, for example, for mounting an automotive fuel injector on a combustion exhaust system to inject an $NO_x$ reducing fluid into the exhaust system.

10 Claims, 3 Drawing Sheets

FLUID-COOLED MOUNT FOR AN INJECTOR

CROSS-REFERENCE TO RELATED APPLICATION

This application claims the priority under 35 USC 119(e) of Provisional Application No. 60/369,955, filed Apr. 3, 2002, which is incorporated into this application by reference.

BACKGROUND OF THE INVENTION

1. Field of the Invention

This invention relates to a fluid-cooled mount for an injector.

2. Description of Related Art

Injection of one fluid into another is a frequent operation applied in the chemical processing industry. In cases where the receiving fluid or processing environment are at elevated temperatures, the injection equipment is at risk of thermal damage. In some applications, objects may strike the injection equipment, thus leading to the possibility of impact damage. This is of particular importance in connection with injectors and equipment utilized in engine exhaust purification. That is, engine exhaust purification may involve a process whereby one or more liquid reagents are injected into a stream of hot engine exhaust. This reagent is typically employed in connection with lean $NO_x$ catalysts, SCR systems, or particulate filter systems. Since the exhaust gas is at an elevated temperature (200–600° C.), the injector is subject to significant thermal load. This can lead to injector malfunction and thus system failure. Because of very strict federal DOT and EPA regulations and state statutes, it is imperative that such exhaust be capable of being purified on a reliable and effective basis without risk of damage or breakdown of the equipment.

Reagent injectors for engine exhaust purifiers are sometimes installed on trucks, buses and off-road vehicles. The environment on the exhaust pipe (under or behind the vehicle) can be hazardous for delicate components like injectors because of impacts from road debris such as rocks, metal shards, etc.

The basic principle of injecting fuel or an other reagent into an exhaust pipe has been known and practiced in the art since the early days of automobile catalytic converters and is described in, for example, U.S. Pat. Nos. 3,842,600 and 3,945,204.

U.S. Pat. Nos. 4,341,193; 4,436,071; 4,503,826; 4,539,962; 4,905,651; 5,280,774; and 5,605,042 disclose fuel injectors in which the fuel circulates through a chamber formed within the body of the injector and a part only of that fuel is dispensed from that chamber by passing from that chamber into the nozzle of the injector and opening of a valve in the nozzle of the injector.

U.S. Pat. No. 5,522,218 discloses a combustion exhaust purification system including an injector for injecting a $NO_x$ reducing fluid into the exhaust passage. The injector is cooled by the flow of engine cooling fluid through passages entirely within the injector mounting.

U.S. Pat. No. 5,915,626 discloses a fuel injector where the fuel is heated, and the magnetic coil of the injector valve consequently cooled, by passage of the fuel through the injector.

U.S. Pat. No. 6,279,603 discloses a fluid cooled injector for delivering a fluid into a hot gas stream, such as an exhaust gas stream, in which the fluid to be injected circulates through a chamber formed within the body of the injector and a portion of that fluid is dispensed from that chamber into the gas stream by opening of a valve in the chamber.

U.S. Pat. No. 6,481,641 discloses a fuel injector assembly having a heat exchanger for fuel preheating where the fuel to the injector passes through a preheater chamber surrounding the injector.

These and other documents cited in this application are incorporated into this application by reference.

SUMMARY OF THE INVENTION

In a first aspect, this invention is a fluid-cooled mount for an injector, the injector having a fluid inlet for receiving a fluid to be dispensed through the injector, a closed body, and a nozzle for dispensing the fluid, the mount comprising:

(a) a mounting block for receiving the injector, having an interior and an exterior and:

(i) an injector body receiving chamber and an injector nozzle receiving chamber within the interior of the block, contiguous with one another at a surface lying in the block, the injector body receiving chamber extending through a first exterior surface of the block and the injector nozzle receiving chamber extending through a second exterior surface of the block, the injector body receiving chamber being configured to receive the body of the injector; the injector nozzle receiving chamber being configured to receive the nozzle of the injector when the body of the injector is received in the injector body receiving chamber;

the fluid inlet of the injector lying exterior to the block when the body of the injector is received in the injector body receiving chamber, (ii) a first seal configured to prevent fluid flow between the injector body receiving chamber and the exterior of the block when the injector is received in the block;

(iii) a second seal configured to prevent fluid flow between the injector body receiving chamber and the injector nozzle receiving chamber when the injector is received in the block;

(iv) a fluid inlet connecting the injector body receiving chamber to the exterior of the block;

(v) a fluid outlet connecting the injector body receiving chamber to the exterior of the block; and (b) a manifold connecting the fluid inlet of the block to the fluid inlet of the injector.

In a second aspect, this invention is a fluid-cooled injector comprising the fluid-cooled mount of the first aspect of this invention with an injector received therein.

In a third aspect, this invention is a fluid-cooled injector system employing the fluid-cooled injector of the second aspect of this invention.

In a fourth aspect, this invention is a combustion exhaust purification system employing the fluid-cooled injector system of the third aspect of this invention.

In a fifth aspect, this invention is a method of dispensing a fluid using the fluid-cooled injector of the second aspect of this invention or the fluid-cooled injector system of the third aspect of this invention.

In a sixth aspect, this invention is a method of combustion exhaust purification by use of the combustion exhaust purification system of the fourth aspect of this invention.

DETAILED DESCRIPTION OF THE INVENTION

As used herein and in the following claims, articles such as "the", "a" and "an" can connote the singular or plural.

This invention provides a fluid-cooled mount for an injector, especially suitable to house an injector for injecting a fluid into a combustion exhaust pipe for treatment of the exhaust, as discussed later in this application. In addition, it provides a mechanism to protect the injector from the environment. The present mount is easily manufacturable, and provides a convenient method of securing the injector into the mount. It is capable of use with a wide variety of injectors, including those readily commercially available as fuel injectors for internal combustion engines; and permits the ready placement of the injector in the mount and removal therefrom for exchange or cleaning. This invention is also capable of being used in environments other than exhaust treatment, such as chemical processing, oil refining, and food manufacturing.

Additional features and advantages of the invention are written in the description which follows, and in part, will be obvious from the description, or may be learned by practice of the invention as described in this application.

Figure 1:
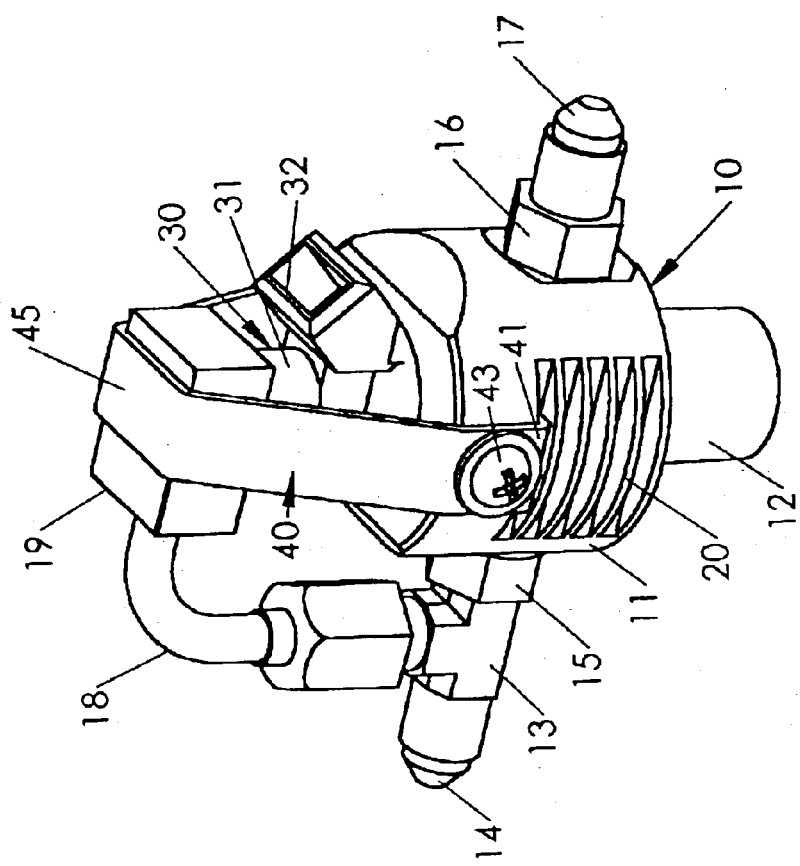
FIG. 1 is a perspective view of a fluid-cooled injector of this invention (an injector received and clamped into the fluid-cooled mount of this invention).

FIG. 1 is a perspective view of a fluid-cooled injector of this invention (an injector received and clamped into the fluid-cooled mount of this invention). The injector mount has a mounting block shown generally at 10 for receiving the injector shown generally at 30, a manifold 13 for distributing fluid entering at fitting 14 between the inlet 15 of the block 10 and the pipe 18 and connector 19 connected to the fuel inlet of the injector 30, a fluid inlet 15 to the mount, and a fluid outlet 16 from the mount to permit an outflow of fluid at fitting 17. In this embodiment, the block 10 is shown as generally cylindrical with flattened faces on the upper part 11 of the block and cooling fins 20 on those faces, and a lower part 12 of the block that is also cylindrical and of smaller diameter. Also, in this embodiment, the manifold is entirely outside the block. The injector 30, most of which is received within the block, has a body 31 having therein a socket 32 for the connection of electrical signals to the injector to operate it, while the fuel inlet for the injector lies inside connector 18. In this embodiment, the injector is secured to the block by a clamp, here a strap shown generally at 40 secured to the block 11 at its ends 41 and 42 by screws 43 and 44 respectively so that its middle 45 overlies the top of the injector.

Suitable materials for the block 10 are metals and metal alloys that are readily shapeable and are preferably of high thermal conductivity; and suitable such materials include aluminum and its alloys and copper and its alloys such as brasses and bronzes. Where less cooling is required, less thermally conductive metals such as steels, for example, stainless steels, may be used. Suitable materials for the strap 40 are metals and metal alloys that are readily shapeable and which retain their configuration after shaping; these include the materials mentioned above.

It will be apparent to a person of ordinary skill in the art, having regard to that skill and this disclosure, that the external shape of the block itself is a matter of design choice, provided only that it is suitable for the intended use. A generally cylindrical shape is convenient for manufacture. In some applications, the fluid flowing through the mount may be above ambient temperature, for example at temperatures up to about 120° C.; and/or the mount may be emplaced in a high-temperature environment, such as on a combustion exhaust pipe, e.g. the exhaust pipe of a vehicle engine. In some of these cases, there may be a need for additional heat dissipation, and the mount can be manufactured to include an additional heat dissipating means such as the fins 20 shown in FIG. 1. In other embodiments, not shown, other heat dissipating pins or fins may be attached to the outside of the mount (for example, at the same positions as the fins 20 shown in FIG. 1) but not be integral with the block: in such cases, the fins may be larger than the block if desired and may be made of a different material from the block. Of course, if the fins are not necessary, they may be omitted.

The block will generally also be provided with means for attaching the mount to the environment of use, such as to a combustion exhaust pipe. This means for attachment may, for example, be external threading (not shown) on the lower part 12 of the block enabling the mount to be screwed onto a fitting on or attached to the exhaust pipe, and a person of ordinary skill in the art will have no difficulty in selecting a particular means for attachment of the mount to a given environment of use. A particularly convenient mount for use with a thin-walled pipe, such as an exhaust pipe, is the mount described in Application No. 10/xxx,xxx filed concurrently herewith and claiming the benefit of Provisional Application No. 60/369,911, and the corresponding provisional application are incorporated into this application by reference.

Where the mount is used to hold an injector to dispense fluid into a high temperature environment, such as to dispense a $NO_x$ reducing fluid into a combustion exhaust pipe, the mount may also include a heat shield fastened below or around the lower part 12 of the block to shield the block and the injector received therein from radiant heat transfer. Such a heat shield may be formed of any suitable material, such as a metal or alloy (for example, mild steel, stainless steel, or aluminum or an aluminum alloy) or a laminate, and may have a thickness of about 0.5–5 mm, e.g. about 1 mm, and a diameter large enough to provide good thermal shielding, such as 50–200 mm, e.g. about 100 mm. The heat shield may also comprise a multi-layer material or laminate such as metal-reinforced silicate fiber, and may also be provided with additional coatings such as anodization or may be polished to enhance its performance.

It may be seen that the strap 40 not only clamps the injector 30 into the block 10 but also provides some physical protection for the injector 30 and the connector 19. While the strap 40 is shown in these Figures as relatively narrow, having a width considerably less than the external dimensions of the block 10 of the mount, a wider strap may also be used to provide greater protection for the injector and the fluid inlet, manifold, outlet, and connector if desired.

Figure 2:
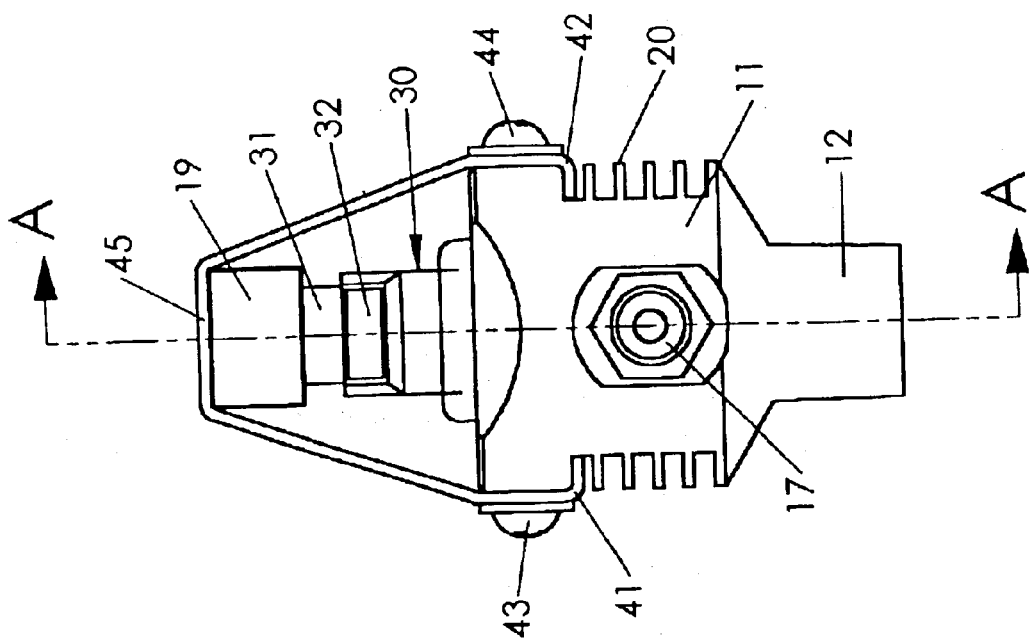
FIG. 2 is a side view of the fluid-cooled injector of FIG. 1 taken from the direction of the fluid outlet.

FIG. 2 is a side view of the fluid-cooled injector of FIG. 1 taken from the direction of the fluid outlet, and illustrates the clamp arrangement and the placement of the cooling fins in greater detail.

Figure 3:
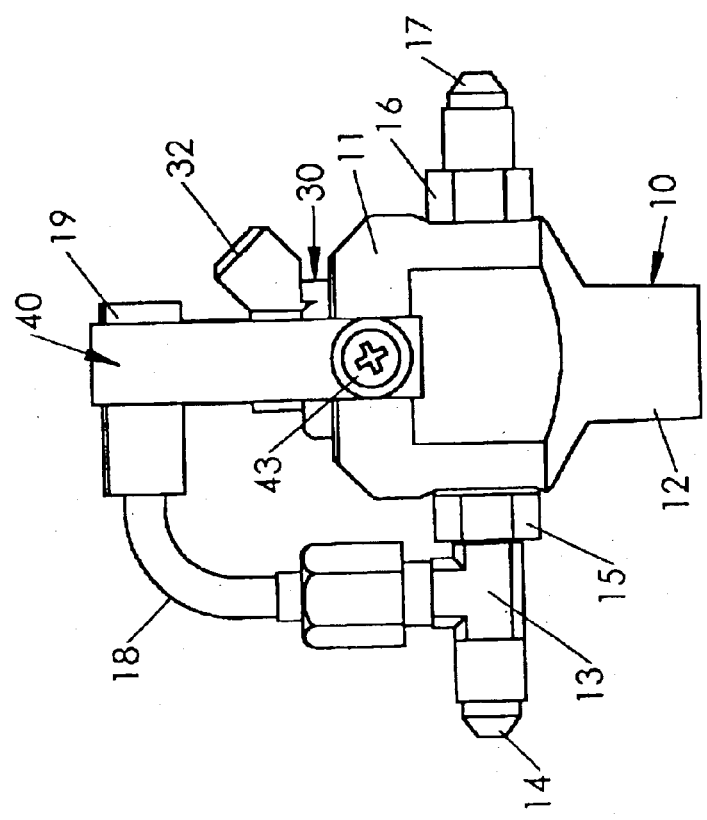
FIG. 3 is a side view of the fluid-cooled injector of FIG. 1 perpendicular to the view of FIG. 2.

FIG. 3 is a side view of the fluid-cooled injector of FIG. 1 (though here without the cooling fins) perpendicular to the view of FIG. 2, illustrating the inlet, outlet, and manifold from the outside in greater detail.

Figure 4:
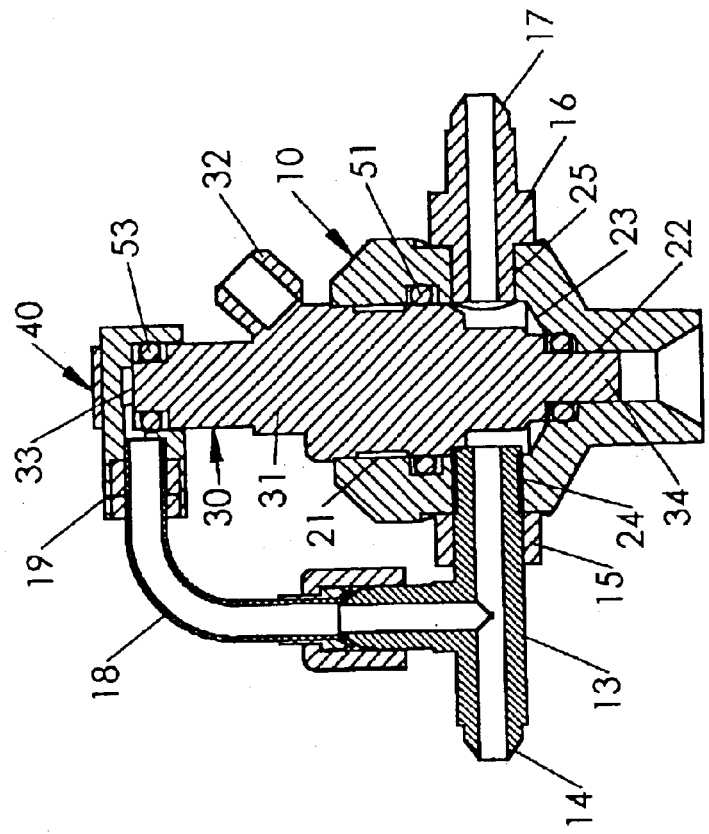
FIG. 4 is a cross-section along line A-A of FIG. 2.

FIG. 4 is a cross-section along line A-A of FIG. 2, showing the interior of the block 10. The block 10 has an injector body receiving chamber open to the top of the block and defined by walls 21, receiving the lower part of the body 31 of the injector; and an injector nozzle receiving chamber open to the bottom of the block and defined by walls 22, receiving the nozzle of the injector, with walls 23 defining a surface at which these chambers are contiguous. Typically, these two chambers are cylindrical, and are coaxial, for manufacturing convenience, but neither the cylindrical shape nor the coaxiality is required. A first seal, shown here as O-ring 51, prevents fluid flow between the injector body receiving chamber and the exterior of the block (i.e. leakage from the chamber past the injector body); and a second seal, shown here as O-ring 52, prevents fluid flow between the injector body receiving chamber and the injector nozzle receiving chamber. The body of the injector is closed so that fluid in the injector body receiving chamber cannot enter the body of the injector (in contrast to the injectors of, for example, U.S. Pat. Nos. 4,341,193; 4,436,071; 4,503,826; 4,539,962; 4,905,651; 5,280,774; and 5,605,042, where fluid passes from a chamber surrounding the injector nozzle into the injector nozzle and is dispensed therefrom by opening of a valve in the nozzle). Thus the injector 30, although partly surrounded and cooled by fluid circulating through the block from inlet 15 to outlet 16, is not open to that fluid; and the fluid which is dispensed by the injector passes from the manifold 13 to the inlet 33, through the body 31 of the injector, and is dispensed through the nozzle 34. A seal, shown as O-ring 53, prevents fluid loss between the connector 18 and the inlet 34 of the injector. Two further passageways, typically perpendicular to the injector body receiving chamber, link the injector body receiving chamber to the exterior of the block 10, and connect to inlet 15 and outlet 16.

A suitable injector 30 can be selected according to the desired fluid and flow-rate and may be readily installed in the injector mount or removed therefrom. As may be seen, the internal design of the mount is readily modifiable to accept injectors of different designs and sizes (such as by using blocks having different diameters and depths of the injector body and injector nozzle receiving chambers); but the functionality and simplicity of the mount of this invention remains the same. The interior configuration of the injector itself is not shown in FIG. 4, as the injector is not itself a part of this invention; but it will readily be understood that the injector has an internal structure such that fluid entering the injector at fluid inlet 33 at the top of the injector passes through an aperture through the body 31 of the injector and is dispensed through the injector nozzle 34 under the control of a valve within the injector body such as an electromagnetic valve actuated by electrical signals received through a plug inserted in socket 32.

Other seals than the O-rings shown in FIG. 4 may of course be used to sealingly receive the injector 30 within the injector receiving chamber. For example, O-ring 52 could be replaced by a flat gasket compressed by the body 31 of the injector against walls 23. Also, instead of O-ring 51 surrounding the body 31 of the injector in the manner shown in FIG. 4, the injector might, for example be externally threaded and have an enlarged body portion near the top of the body, and be screwed into a correspondingly threaded upper part of the injector receiving chamber compressing a flat gasket in the same way that, for example, a spark plug is screwed into a cylinder head. Similarly, an alternative seal may replace O-ring 53. However, the O-ring seals shown in the Figure are convenient. A person of ordinary skill in the art will have no difficulty in designing suitable seals to ensure that an injector is sealingly received in the mount of this invention. The materials of the O-rings or other seals will be chosen to be compatible with the materials of construction of the mount and the injector and to be compatible with the fluid to be injected: for example, if the fluid is a hydrocarbon fuel, the O-rings should be resistant to hydrocarbons.

For manufacturing convenience, it is attractive to machine threads into the walls 24 and 25 of the passageways leading from the injector body receiving chamber to the exterior of the block; and for the inlet and outlet to be externally threaded at their ends to engage these threaded passageways. Gaskets (not shown in the Figure) may be used to enhance the seals between the inlet 15 and the block and between the outlet 16 and the block. The manifold 13 may be a conventional T-joint, and the pipe 18 may be conventional pipe used for medium-pressure fluid transfer. Exemplary convenient fittings comprising the inlet, outlet, manifold, and pipe are those used for fuel lines in automobiles and the like, made, for example of copper or copper alloys tightening with compression fittings; and details of their construction are well known to persons of ordinary skill in the art.

In this and the other Figures, the manifold 13 is shown as external to the block 10 of the mount; but it will be apparent to a person of ordinary skill in the art that the manifold may be machined within the block 10 if desired, so that fluid enters the block at inlet 15 and is divided by an internal manifold between fluid passing through the block past the injector body within the injector body receiving chamber to the outlet 16 and fluid passing through pipe 18 (which will now be connected at one end to a passageway in the block itself) and connector 19 to the fluid inlet 33 of the injector 30.

Figure 5:
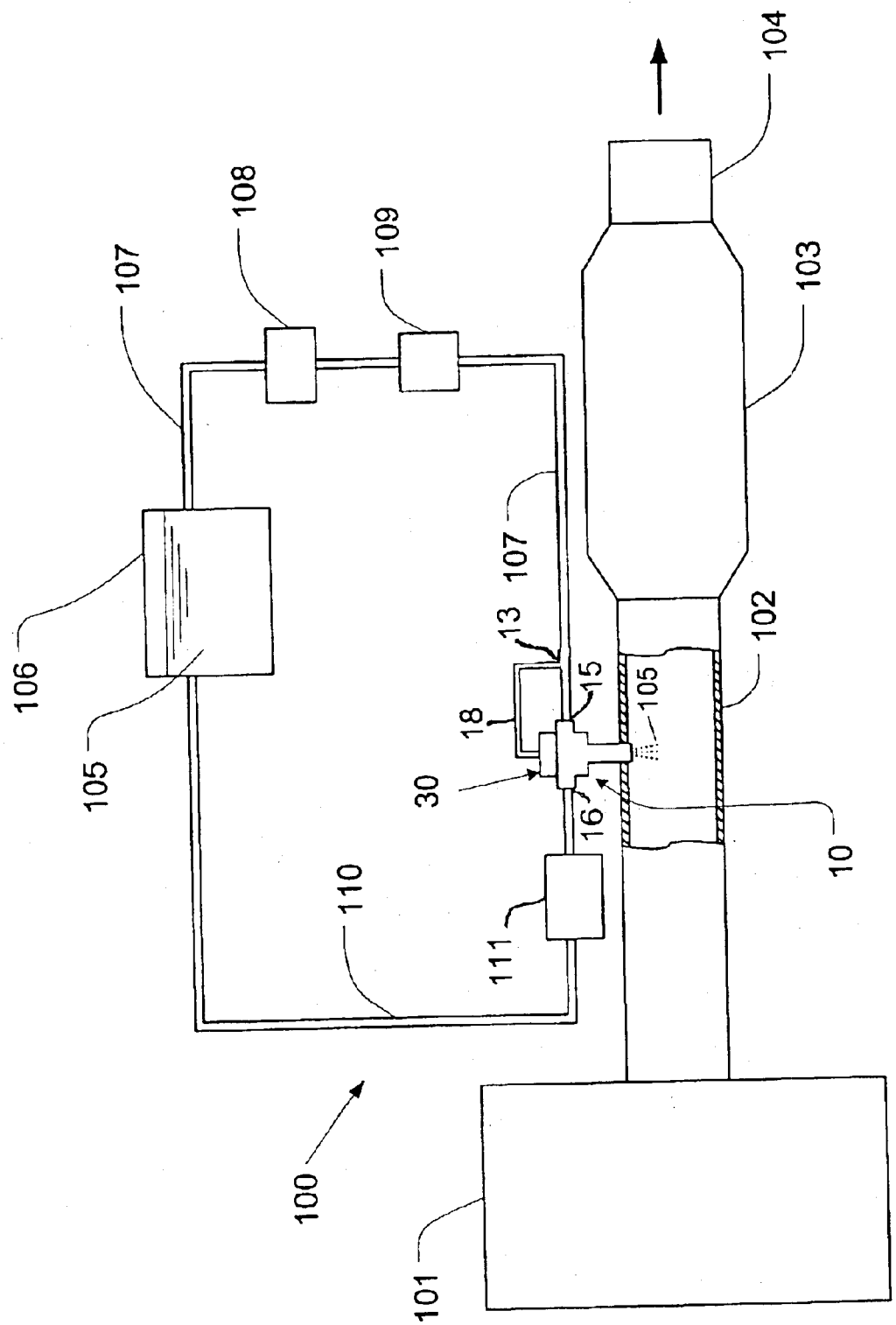
FIG. 5 is a schematic of a combustion exhaust purification system using the fluid-cooled injector of this invention.

FIG. 5 is a schematic of a combustion exhaust purification system using the fluid-cooled injector of this invention. Referring to this Figure, an exhaust gas purification system 100 according to the fourth aspect of this invention is shown in use with a combustion exhaust source 101, which is typically an internal combustion engine and more typically a diesel engine. The combustion exhaust exits the exhaust source 101 by exhaust pipe 102, passing through a catalytic converter 103 and exiting at exhaust outlet 104. Catalytic converter includes a $NO_x$ reducing catalyst, such as a zeolite, a precious metal-based catalyst, or a combination of both. Additional catalysts, such as an oxidation catalyst, or a three-way catalyst followed by an oxidation catalyst, all well-known to the art, may also be used downstream of the $NO_x$ reducing catalyst. As the exhaust leaves source 101, an amount of a $NO_x$ reducing fluid 105 is injected into exhaust pipe 102 by injector 30 mounted in the fluid-cooled injector mount 10 of this invention.

$NO_x$ reducing fluid 105, which may be a hydrocarbon, for example an alcohol such as ethanol, a light hydrocarbon such as propane, or a hydrocarbon fuel such as the fuel for the combustion exhaust source (e.g. diesel fuel when the exhaust source is a diesel engine), or may be any other $NO_x$ reducing fluid known in the art such as ammonia or aqueous urea, is stored in reservoir 106, and carried to the manifold 13 by pipe 107. A pump 108 pressurizes pipe 107, while pressure regulator 111 in return pipe 110 maintains the fluid at the desired pressure. The $NO_x$ reducing fluid passes through filter 109 on its way to manifold 13, and that part of the fluid that flows through the manifold to the inlet 15 of the injector mount 20 passes through the mount from its inlet to its outlet 16, and returns by return pipe 110 to the reservoir 106. A person of ordinary skill in the art will recognize that when the $NO_x$ reducing fluid 105 is the fuel for the combustion exhaust source, such as when the combustion exhaust source is the diesel engine of a vehicle, the reservoir 106 for the NO$_x$ reducing fluid may in fact be the fuel tank for the vehicle, and this arrangement is particularly advantageous.

Although the invention has been described in this application with reference to specific and preferred embodiments, which are exemplary of the invention and are not intended to limit the invention, a person of ordinary skill in the art will be able to conceive modifications and variations on these specific embodiments. All such variations and modifications are included within the intended scope of this invention as represented by the claims and their equivalents.

We claim:

1. A fluid-cooled mount for an injector, the injector having a fluid inlet for receiving a fluid to be dispensed through the injector, a closed body, and a nozzle for dispensing the fluid, the mount comprising:

(a) a mounting block for receiving the injector, having an interior and an exterior and:

(i) an injector body receiving chamber and an injector nozzle receiving chamber within the interior of the block, continuous with one another at a surface lying in the block, the injector body receiving chamber extending through a first exterior surface of the block and the injector nozzle receiving chamber extending through a second exterior surface of the block, the injector body receiving chamber being configured to receive the body of the injector;

the injector nozzle receiving chamber being configured to receive the nozzle of the injector when the body of the injector is received in the injector body receiving chamber;

the fluid inlet of the injector lying exterior to the block when the body of the injector is received in the injector body receiving chamber;

(ii) a first seal configured to prevent fluid flow between the injector body receiving chamber and the exterior of the block when the injector is received in the block;

(iii) a second seal configured to prevent fluid flow between the injector body receiving chamber and the injector nozzle receiving chamber when the injector is received in the block;

(iv) a fluid inlet connecting the injector body receiving chamber to the exterior of the block;

(v) a fluid outlet connecting the injector body receiving chamber to the exterior of the block; and (b) a manifold connecting the fluid inlet of the block to the fluid inlet of the injector.

2. The mount of claim 1 where the exterior surface of the block is finned.

3. The mount of claim 1 where at least a part of the manifold lies within the block.

4. The mount of claim 1 where the manifold lies entirely outside the block.

5. The mount of claim 1 further comprising:

(c) a clamp connected to the block and securing the injector to the block when the injector is received within the block.

6. The mount of claim 1 where the clamp securing the injector to the block is a strap fastened at each end to the block.

7. A fluid-cooled injector comprising the fluid-cooled injector mount of claim 1 having an injector received therein.

8. A fluid-cooled injector system, comprising:

(a) the fluid-cooled injector of claim 7;

(b) a fluid reservoir for fluid to be dispensed through the injector;

(c) an inlet pipe connecting the fluid reservoir to the manifold, the inlet pipe having a pump operatively connected therein to pump fluid from the reservoir to the manifold, and (d) an outlet pipe connecting the outlet to the fluid reservoir;

such that, when the system is used, fluid is pumped from the fluid reservoir to the manifold through the inlet pipe, a part of the fluid flowing through the manifold to the fluid inlet of the injector to be dispensed by the injector, and the remainder of the fluid flowing through the inlet, the injector body receiving chamber, and the outlet, and returning through the outlet pipe to the fluid reservoir.

9. A combustion exhaust purification system comprising:

(a) an exhaust pipe having one end connected to a combustion exhaust source;

(b) a NO$_x$ reducing catalyst positioned in the exhaust pipe;

(c) the fluid-cooled injector system of claim 8 having the fluid-cooled injector mounted on the exhaust pipe between the combustion exhaust source and the NO$_x$ reducing catalyst, where the fluid is a NO$_x$ reducing fluid.

10. The combustion exhaust purification system of claim 9 further comprising a heat shield between the exhaust pipe and the fluid-cooled injector.

* * * * *